May 9, 1933. F. B. BELL 1,908,655
SHOCK ABSORBER
Filed May 3, 1929 3 Sheets-Sheet 3

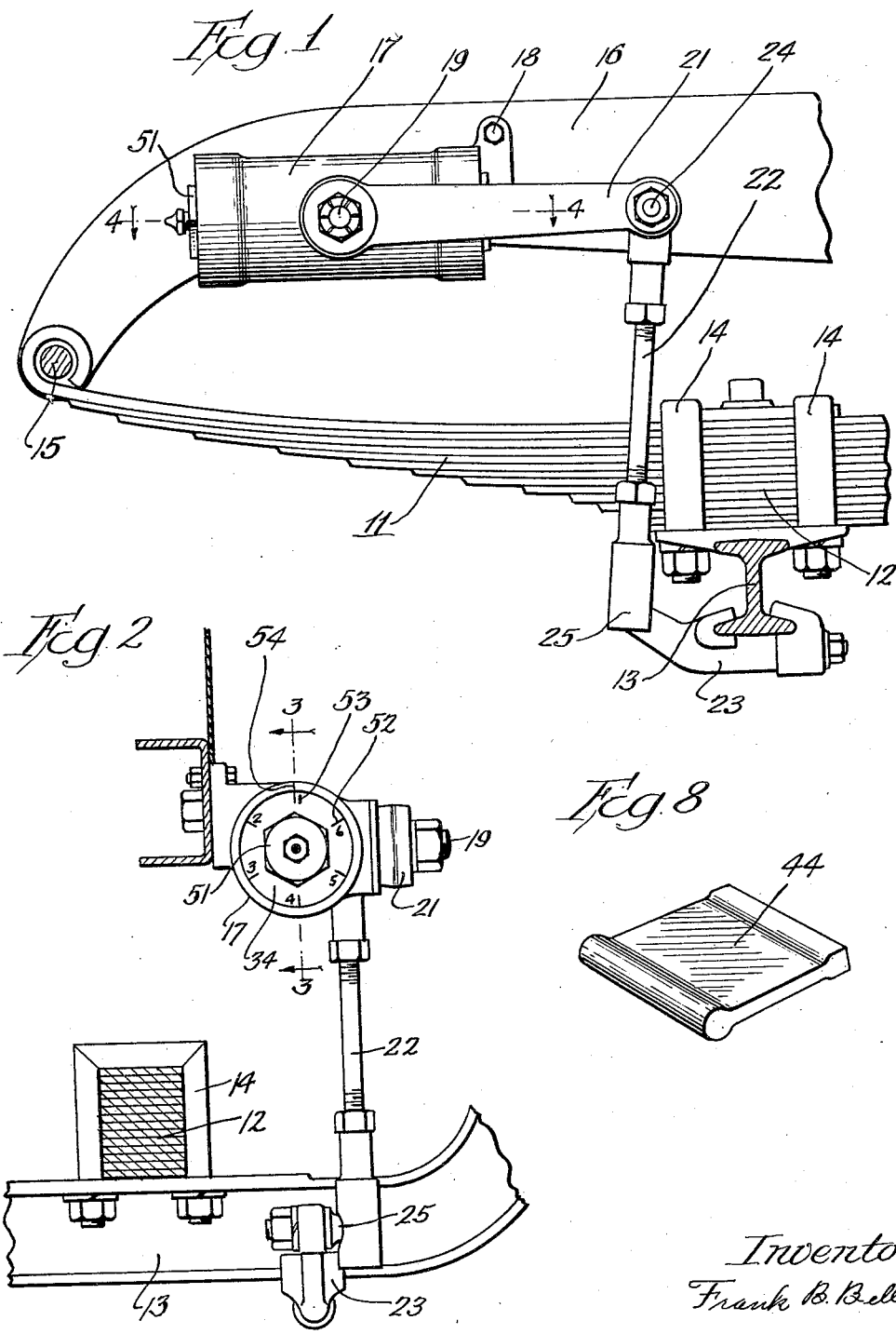

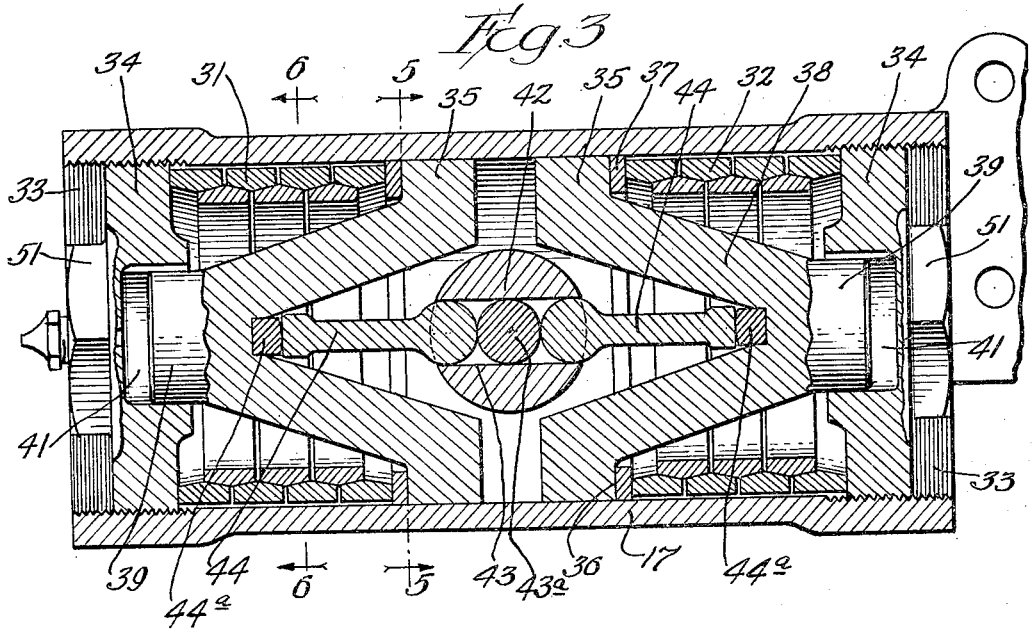
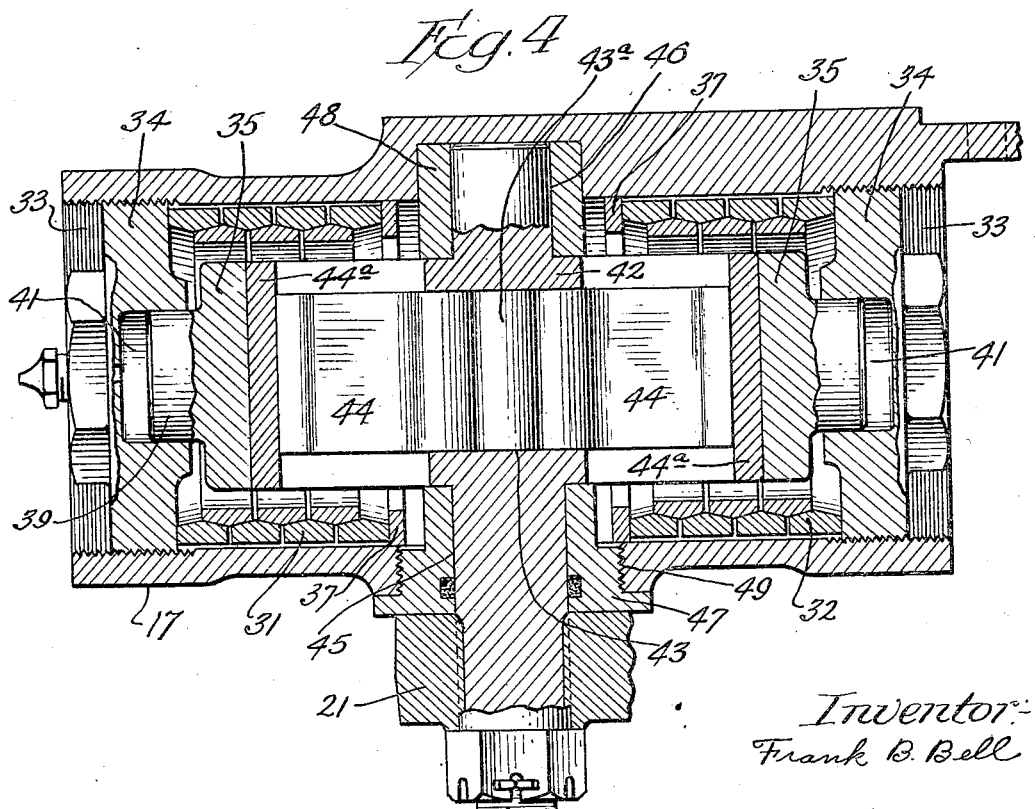

Inventor:
Frank B. Bell
John C. Carpenter
Atty.

Patented May 9, 1933

1,908,655

UNITED STATES PATENT OFFICE

FRANK B. BELL, OF PITTSBURGH, PENNSYLVANIA, ASSIGNOR TO EDGEWATER STEEL COMPANY, OF PITTSBURGH, PENNSYLVANIA, A CORPORATION OF PENNSYLVANIA

SHOCK ABSORBER

Application filed May 3, 1929. Serial No. 360,025.

This invention relates in general to springs for automobiles, motor trucks, and vehicles of other sort, and while the invention is hereinafter described as embodied in a shock absorber, it will be manifest that it has valuable application for use in substitution for or incorporation as a part of the spring suspension itself.

A principal object of this invention is the provision of a vehicle spring assembly, the parts of which will be so constructed and arranged as to permit the minor shocks and vibrations which are occasioned by mere undulations in the road bed to be felt and absorbed by the usual relatively non-friction, highly flexible, and sensitive spring, but which, in case of a major movement or a severe shock, will absorb a considerable percentage of the rebound resulting from the recoil action.

A further important object of the invention is the provision for the accomplishment of these desirable results in a construction which is readily adapted for embodiment in a shock absorber, i. e. a device which may be associated with the ordinary usual springs of automobiles, without reconstruction, reformation, or rearrangement of either said springs or their attaching parts.

Numerous other objects and advantages of the invention will be apparent as it is better understood from the following description, which, taken in connection with the accompanying drawings, discloses a preferred embodiment thereof.

Referring to the drawings:

Figure 1 is a side elevation of a shock absorber in which my invention is embodied, showing also a portion of the usual spring, chassis, and axle assembly;

Fig. 2 is an end view of the same;

Figure 5:
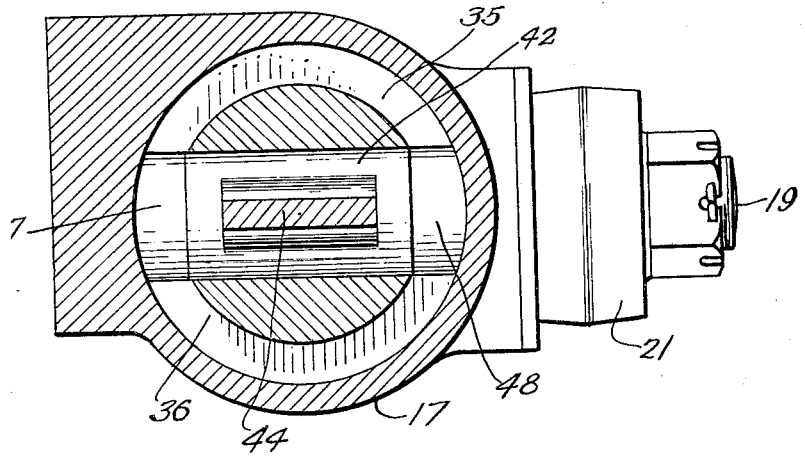
Figure 6:
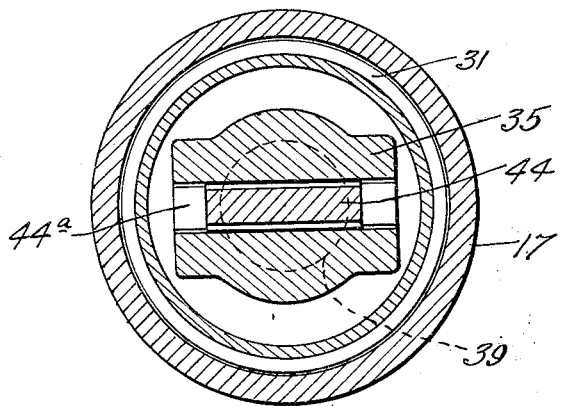
Figure 7:
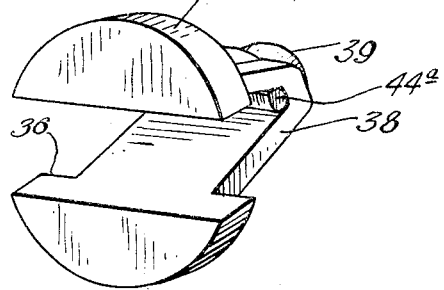

Figs. 3 and 4 are sections taken respectively upon the lines 3—3 of Fig. 2 and 4—4 of Fig. 1;

Figs. 5 and 6 are sections taken substantially upon the lines 5—5 and 6—6 of Fig. 3;

Fig. 7 is a perspective view of one of the yokes or retainers of the spring unit, and Fig. 8 is a perspective view of one of the cam or toggle arms.

For the purpose of illustrating my invention, I have shown on the drawings an end 11 of a spring 12, which is mounted upon and secured to the automobile axle 13 by the usual clamping U-bolts 14. The end 11 is connected in any usual or preferred manner at 15 to the chassis, indicated generally at 16.

The shock absorber comprises a casing 17 fixed at 18 to the chassis above and at one side of the axle 13. This casing houses the shock absorbing or spring units to be presently described and these units are actuated by, and themselves actuate through, a rotatable central member 19 which extends through the casing, and which outside the casing is provided with an arm 21 normally arranged in horizontal position. The free end of this arm is connected by an expansible or adjustable link 22 to a clamp 23 secured to the under portion of the axle 13, it being understood that the connection 24 between the arm 21 and the link 22 and the connection at 25 between the link 22 and the clamp 23 are pivotal.

Referring now more particularly to Figs. 3 to 8, which disclose the construction of the parts within the casing and their arrangement, it will be noted that two spring units 31 and 32, preferably both of friction type, are included, these also being preferably duplicates one of the other. Each of these spring units in the embodiment shown on the drawings is of the ring spring construction shown, described, and claimed in United States Letters Patent to Kreissig, No. 1,515,346. Each unit is composed of a series of outer continuous rings, individually having oppositely beveled faces on their inner periphery, and a series of inner rings alternating individually with the rings of the outer series, these inner rings having their outer faces beveled for surface engagement with the beveled faces of the outer rings. The parts thus constructed and assembled provide the yielding spring resistance by the stretching and compression of the ring members.

The casing 17 consists of a cylinder or barrel open at its ends and provided at these locations with threads 33 with which are engaged cylinder heads 34. The spring units 31 and 32 are arranged inwardly of these heads and bear against them.

Two yoke members 35, one for each spring unit, are positioned adjacent the middle of the casing and form bearing for the adjacent ends of the springs. Each unit 35 comprises an outwardly extending annular shoulder 36, a V-shaped body 38, and a round stub shaft or head 39. This head 39 slidably fits within the recess or pocket 41 provided for the purpose in the adjacent cylinder head 34. The ring spring unit bears upon its companion shoulder 35 through a washer 37.

The rotatable member 19 which extends through the casing and has bearing in it is provided with a central cylinder 42, this cylinder containing a diametrically arranged slot 43 of rectangular cross section. A cylindrical roller 43$^a$ substantially coaxial with the shaft 19 floats inside of the slot 43. A toggle link or arm 44 of the flat wide construction, shown more particularly in Fig. 8, is provided to bear on and extend from the roller 43$^a$ into the apex of each V-shaped spring retainer or compressor, where it bears on the curved surface of a wearing plate 44$^a$. At the apex, the retainer is shaped to receive the wearing plate 44$^a$, as indicated in Figs. 3 and 7, and the link or arm 44, therefore, has flat bearing on the wearing plate 44$^a$ and, at the other end, a rounded bearing on the roller 43$^a$. The shaft 19 has bearing at 45 and 46 in bushings 47 and 48 arranged in the casing wall, the bushing 47 being threadedly secured at 49.

Thus constructed and arranged, it will be apparent that the spring units are arranged for opposite expansion and contraction, and when the parts are in the position shown in Fig. 3, which is the normal position, the thrust of the ring springs is transmitted from one to the other and sustained directly by compression of the links or arms 44, and the roller 43$^a$, there being no load, when the parts are thus positioned, upon the arm 21 and link 22. This is the position of the parts when the automobile or other vehicle is moving over a smooth, even surface.

The connection between the axle and the shock absorber is a reducing connection, and the arcuate rotation of the shaft 19 and the slot 43, as a result of relative vertical movement between the chassis and axle 13, is accordingly reduced. When the vehicle encounters mere undulation and minor road irregularity, the shaft 19 and the cylinder 44 are not moved sufficiently from the position shown in Fig. 3 to materially disturb the balanced condition of the friction spring units, so that the vibrations and minor shocks resulting are not resisted by the spring action. For such minor movements of the shaft 19 and the cylinder 42, the entire recoil force of the springs 31 and 32 will act in a practically straight line, being transmitted from each spring through the saddles 38, the wearing plates 44$^a$ and the arms 44 to the roller 43$^a$. Said minor movements will be resisted by rolling friction only and the shock absorbing device will thus offer a very small resistance to same. When, however, a more severe shock is experienced, the cylinder 44 is rotated in greater amount and the recoil action of the friction spring increases the deflection of the main spring of the vehicle thereby softening the effect of the shock.

After the shock and as the main spring of the vehicle tends to rebound, the cylinder is of necessity rotated to recompress the friction spring units, the compression force, as measured at the axle of the vehicle constantly decreasing, due to the decreasing leverage of the arms 44, until it approaches zero when the shaft 19 reaches the position shown in Figure 3, which corresponds to the normal riding position of the vehicle body. It will be manifest, therefore, that as the main spring tends to gather momentum in recoil, an initially powerful, but suitable decreasing resistance of the shock absorber is presented. In this action, a large percentage of the force imparted to the friction springs is dissipated in friction.

I have provided means for accurately adjusting the friction spring units into predetermined relationship, each with the other, and also for adjusting the compression of the two units in accordance with the weight of the vehicle or the weight of the vehicle and its intended normal load. This adjustment not only insures proper action of the shock absorber but permits the provision of a shock absorber of single dimension and construction for use for vehicles having bodies and carrying loads of widely different weights.

The adjustment is effected by the rotation inwardly or outwardly, as the occasion may require or make desirable, of the casing heads 34. Upon each casing head I have provided a hexagonal part 51, which may be engaged by a wrench to turn the head to increase or diminish the normal compression of the friction spring units. Each cylinder head is provided with graduation marks 52 which are numbered at 53 or provided with other indicia. A reference line or mark 54 is provided at the top of each end of the casing body, with which a desired graduation mark may be brought in registration. This facilitates the compression of the two springs in adjustment accurately and in the same degree. Such minor differences in the compression or recoil forces of the opposing springs as may remain after the above adjustment will be equalized or eliminated by a small movement of the cylinder 43$^a$ in the slot 42, as it will naturally take the position at which the two opposing forces, acting on same, are equal.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A shock absorber for automobiles and the like, comprising a pair of spring units, at least one of which is of friction spring type, arranged in registratioon for expansion toward each other, a device positioned between said units and normally holding them under compression, movement of said device under abnormal condition being accompanied by simultaneous expansion of said units.

2. A shock absorber for automobiles and the like, comprising a pair of spring units, at least one of which is of friction spring type, arranged for expansion toward each other, a device positioned between said units and normally holding them under compression, said device comprising a central rotatable member and a thrust member extending to each said unit.

3. A shock absorber for automobiles and the like, comprising a pair of spring units, at least one of which is of friction spring type, arranged for expansion toward each other, a device positioned between said units and normally holding them under compression, said device comprising a cam permitting expansion of the units under abnormal shock.

4. A shock absorber for automobiles and the like, comprising a pair of spring units, at least one of which is of friction spring type arranged for expansion toward each other, a device positioned between said units and normally holding them under compression, said device comprising a central rotatable member mounted for movement with the body of the vehicle, a member mounted for movement with its axle, and a linkage connection between said members.

5. A shock absorber for automobiles and the like, comprising a pair of spring units, at least one of which is of friction spring type, arranged for expansion toward each other, a device positioned between said units and normally holding them under compression, and means for adjusting the compression of said units to predetermined relation.

6. A shock absorber for automobiles and the like, comprising a pair of spring units, at least one of which is of friction spring type, arranged for expansion toward each other, a device positioned between said units and normally holding them under compression, and means for adjusting the compression of said units in accordance with the weight and load of the vehicle.

7. A vehicle spring assembly comprising, in combination, a pair of ring spring units arranged to oppositely expand and compress, and means for compressing and expanding said units in accordance with the shock in service, said means normally holding said ring spring units under maximum compression and ineffective.

8. A shock absorber for an automobile and the like, comprising a casing adapted to be fixed to the chassis of an automobile, a pair of ring spring units mounted in said casing, a rotatable member between said units, an arm extending from said member to each said unit and normally arranged to maintain said units under maximum compression with the force exerted in straight line through the arms in said cam.

9. A shock absorber for an automobile and the like, comprising a casing adapted to be fixed to the chassis of an automobile, a pair of ring spring units mounted in said casing, a rotatable member between said units, an arm extending from said member to each said unit and normally arranged to maintain said units under maximum compression with the force exerted in straight line through the arms in said cam, and means for equalizing the forces acting in opposite direction on the cam.

10. A shock absorber for automobiles and the like, comprising a part attachable to the axle of the automobile, and a part attachable to the chassis or body, one of said parts containing a ring spring assembly comprised of a series of outer and a series of inner continuous rings alternately arranged with respect to each other, and having beveled faces engaging in contact, and means arranged between the other said part and said ring spring for progressively compressing said ring spring upon relative movement of said parts in recoil after shock, and maintaining said ring spring under maximum compression when the automobile is at rest under static load.

FRANK B. BELL.